No. 614,424. Patented Nov. 15, 1898.
W. F. EVANS.
FISH HOOK.
(Application filed Jan. 24, 1898.)
(No Model.)

Witnesses:-
Lee J. Van Horn.
Chapin A. Ferguson.

Inventor:-
William F. Evans.
By Chas. B. Mann
Attorney.

THE NORRIS PETERS CO., PHOTO-LITHO., WASHINGTON, D. C.

UNITED STATES PATENT OFFICE.

WILLIAM F. EVANS, OF BALTIMORE, MARYLAND, ASSIGNOR OF FIVE-NINTHS TO FRANK M. BLANEY AND CHARLES C. DEAVER, OF SAME PLACE.

FISH-HOOK.

SPECIFICATION forming part of Letters Patent No. 614,424, dated November 15, 1898.

Application filed January 24, 1898. Serial No. 667,722. (No model.)

*To all whom it may concern:*

Be it known that I, WILLIAM F. EVANS, a citizen of the United States, residing at Baltimore, in the State of Maryland, have invented certain new and useful Improvements in Fish-Hooks, of which the following is a specification.

This invention relates to an improved fish-hook device in which two hooks are employed to operate in unison, each hook being used as a bait-hook.

The invention will be first described, and then pointed out in the claims.

Figure 1:
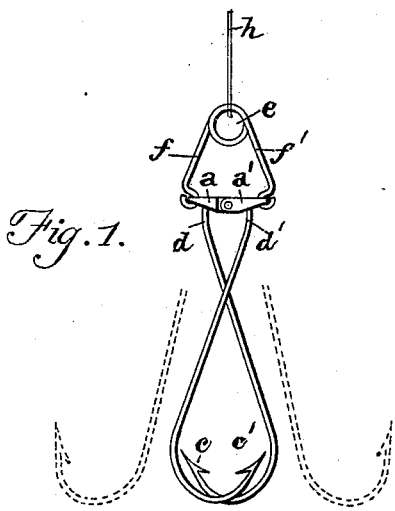
Figure 2:
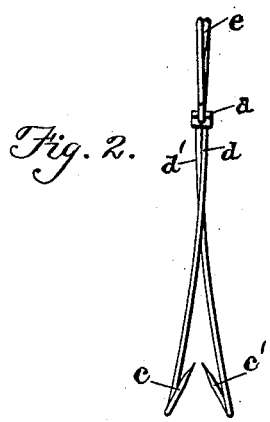
Figure 3:
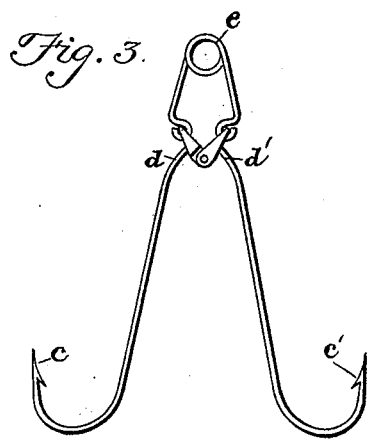
Figure 4:
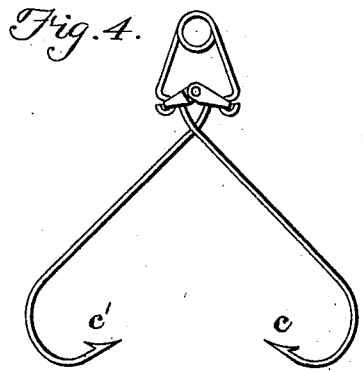
Figure 5:
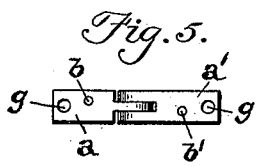

Referring to the accompanying drawings, Figure 1 shows the improved fish-hooks in one of the "set" positions and also in broken lines indicates the position the two hooks assume when "sprung" by a fish biting. Fig. 2 shows the appearance of the two hooks as set in Fig. 1 when viewed in a transverse direction. Fig. 3 shows the position the hooks take when sprung from the set position seen in Fig. 1. This is also the normal relaxed position. Fig. 4 shows another set position of the same hooks. When sprung, the two hooks close toward each other. Fig. 5 shows a view of the toggle.

The form of the improved device, as shown in the drawings, comprises a jointed toggle-arm, two hooks, each one of which has the extremity of its shank attached rigidly to a different section of the toggle-arm, and a spring having two prongs each loosely attached to a different section of the toggle-arm.

The toggle-arm has two sections $a\ a'$, jointed together. Each section has a socket or hole $b$ to receive the end or extremity of the shank of one of the hooks. These holes are not in alinement in the two sections, as will be seen in Fig. 5. In section $a$ the said hole $b$ is nearest one side of the toggle, while in section $a'$ the hole $b'$ is nearest the opposite side of the toggle. The effect of this construction on the hooks will be presently explained.

The two hooks may be alike; but their points project in opposite directions, as shown. One hook $c$ has the end $d$ of its shank inserted in the socket or hole $b$ of the toggle-section $a$, and when the device is in the normal relaxed position, as in Fig. 3, the point of this hook will project outward. The other hook $c'$ has its end $d'$ in the socket or hole $b'$ of the toggle-section $a'$, and its hook-point projects outward in the direction opposite from the first hook. By having the shank ends of the two hooks fixed rigidly by insertion in holes that are nearest opposite sides of the toggle the hooks may be crossed the reverse way when set, as shown in Figs. 1 and 2, so as to produce a slight binding effect or friction where they are in crossed contact that will retain them in that position, the toggle-sections being held substantially straight. It will be seen that whenever the sections of the toggle move, however slight, the hooks must move correspondingly.

The spring comprises a coil $e$, and projecting therefrom are two prongs $f\ f'$, each of which is loosely jointed to a different section of the toggle. The end of each toggle-section has a hole $g$ (see Fig. 5) for attachment of the spring-prong. These spring-prongs are normally relaxed when closed together, as in Fig. 3, where the toggle is bowed, and are under tension when spread apart, as in Figs. 1 and 4, where the toggle is approximately straight. The line $h$ is attached in the eye or coil $e$.

It will be observed that the ends of the two toggle-arms which are jointed together do not have a fixed position; but said jointed ends are free to move up or down, as shown in Figs. 3 and 4.

Only two hooks are used, and both are bait-hooks. It may be said that either hook acts as a trigger to throw the other into play.

In operation the hooks are to be baited as usual and set in either one of the two positions as shown in Fig. 1 or Fig. 4. When the fish takes the hooks set as in Fig. 1, the substantially straight position of the toggle will be disturbed and the tension of the spring comes into play and the two hooks will instantly spring apart in the fish's mouth, as indicated by broken lines, and one or both hook-points will make inside engagement and the toggle-sections will have an elbowed position. When a fish takes either one of the hooks set as in Fig. 4, the toggle's position will be disturbed and the tension of the spring will come into play, and the hook-points will instantly close toward each other and one hook will engage inside the fish's mouth and the other hook engage on the outside. In both cases the hooks will have a certainty of action that insures catching the fish.

Having thus described my invention, what I claim is—

1. A twin fish-hook having in combination two sections of a toggle-arm jointed together; two bait-hooks each having its shank attached rigidly to the side of a different one of the said toggle-sections; and a spring independent of the said bait-hooks but connected directly with the two sections of the toggle, whereby the two hooks have a capacity to be "set" and both baited in either of two positions—in one position so as to move apart when sprung, and in the other position so as to close toward each other when sprung, as set forth.

2. A twin fish-hook having in combination a toggle with two arms jointed together at one end, the said jointed ends being free to move up or down; a hook attached rigidly to each toggle-arm; and a spring for the attachment of the supporting-line—said spring having two prongs, each being loosely jointed to a different arm of said toggle, as set forth.

3. A twin fish-hook having in combination a toggle with two jointed sections; two hooks each of which has its shank attached rigidly to a different section of the toggle and nearest opposite sides thereof, whereby in setting the hooks they may be crossed on each other the reverse way and there will be a binding or friction effect where they are in contact; and a spring having two prongs which connect directly with the toggle-sections, as set forth.

In testimony whereof I affix my signature in the presence of two witnesses.

WILLIAM F. EVANS.

Witnesses:
CHARLES B. MANN, Jr.,
CHARLES C. DEAVER.